Figure 1:
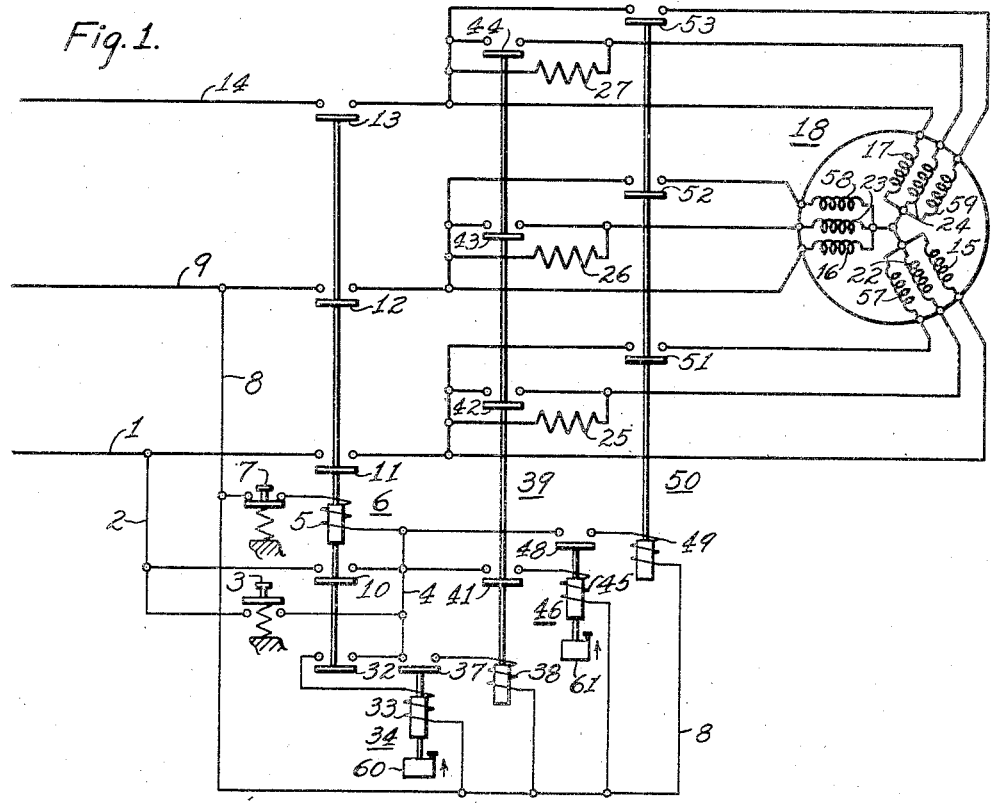

April 28, 1942.     H. TRASSL     2,280,987

METHOD AND CONNECTION FOR STARTING ALTERNATING CURRENT MOTORS

Filed Nov. 15, 1940

INVENTOR
Hans Trassl
BY
Paul E. Friedemann
ATTORNEY

Patented Apr. 28, 1942

2,280,987

UNITED STATES PATENT OFFICE 2,280,987

METHOD AND CONNECTION FOR STARTING ALTERNATING CURRENT MOTORS

Hans Trassl, Berlin-Siemensstadt, Germany, assignor to Westinghouse Electric & Manufacturing Company, East Pittsburgh, Pa., a corporation of Pennsylvania Application November 15, 1940, Serial No. 365,823
In Germany October 31, 1939

9 Claims. (Cl. 172—289)

My invention relates to starting of electric motors and more particularly to the method of, and the starting control systems for, starting alternating current motors.

Various motor starting control systems are known in the prior art, as for instance it is known practice to start an alternating current motor, as a synchronous motor or an induction motor, by connecting only part of its primary winding to the source of supply and then as the speed rises to connect all the primary windings to the source of supply. In the simplest case the primary winding is divided into two electrically equal sections, or circuit branches, and only one of these two sections is connected to the source of power for the purpose of starting the machines.

This method of starting the machine results in a lower starting current, equal to about 60% of the stator current that would flow if both sections of the winding were simultaneously connected to the line. And the starting torque produced in this case is equal to about 45% of the starting torque obtainable by using the entire winding for starting purposes. Furthermore, various other starting control means have been proposed for reducing the value of the current— or for increasing the value of the torque—obtained with the simple starting arrangement just referred to, means which may be resorted to in those instances where the current value or the torque value stated above would not be satisfactory. For instance, it has been proposed to divide the stator winding into more than two sections, and to use less than one-half of the winding for starting purposes when the specified values for starting torque and starting current are relatively low, more than one-half of the winding when the specified values for said torque and said current are relatively high. In addition, it has been proposed to obtain starting torque and starting current values somewhere between the ones just referred to by changing the winding arrangement and connections from star to delta, and vice-versa.

These methods of starting, briefly indicated, do not, for many applications, give the flexibility of starting, that is, do not give the starting torque values and starting current values desired.

One object of my invention is to provide a simple starting scheme for providing novel starting characteristics for alternating current motors.

Another and broad object of my invention is to reduce the starting currents of alternating current motors.

More specifically, my invention provides for obtaining appropriate and desired values of starting current and starting torque by reducing the intensity of the starting current in part of the primary winding with the aid of a starting impedance that may be provided in the form of a resistor, a reactor, or a capacitor, or any combination of these. In other words, the present invention proposes to use the method of dividing the primary winding into sections—which, thus far, has only found application as a substitute for starting methods using starting impedances—in conjunction with the expedient of connecting an impedance in series with one of the sections.

The machine can be started in accordance with the present invention in various manners. For instance, only one section of the winding may be used for starting purposes, in which case this section is connected to the line through a starting impedance, or one section of the winding may be connected to the line through a starting impedance while another section is directly connected to the line. It is equally well feasible, however, to divide the winding into three sections and to leave during the starting period one of these sections disconnected from the line, while the other two sections are connected to the line, one through a starting impedance and the other directly.

Figure 2:
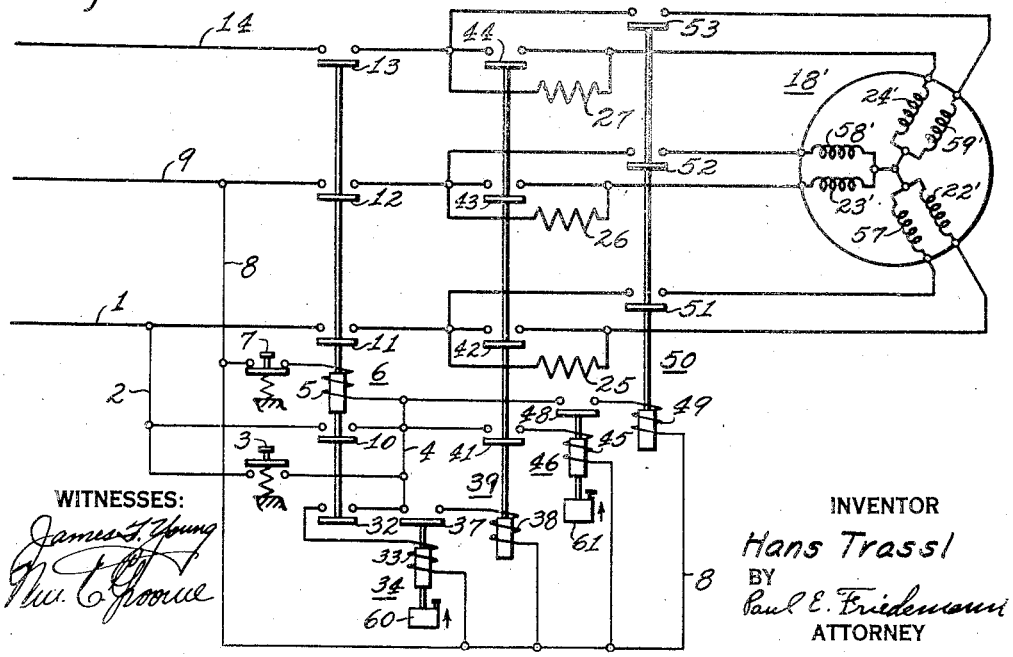

A still better understanding of my invention can be had from a study of the following specification and the accompanying drawing, in which:

Figure 1 shows diagrammatically a starting control utilizing three starting steps, whereas, Fig. 2 shows diagrammatically a starting control utilizing two starting steps.

In Fig. 1, 18 designates the motor to be started having a number of primary windings as indicated. One of each of the phases of the primary windings is provided with an impedance, as the impedances 25, 26, and 27. These impedances may be resistors, reactors, capacitors, or any combinations of these.

The main line switch is designated by 6 and the electromagnetic devices 34, 39, 46, and 50 are the sequence control means for completing the starting cycle. I have shown electromagnetic devices merely for convenience and to show an automatic control, but it is clear that the devices 6, 39, and 50 may be manually operable switches and yet the novel results of my starting control are retained.

A still better understanding of my control may be obtained from a study of a typical starting sequence.

To start the motor 18, the attendant operates the starting switch 3 (see Fig. 1) thereby establishing a circuit from bus 1 through conductor 2, starting switch 3, conductor 4, actuating coil 5 of the main line contactor 6 and stop switch 7, conductor 8 to the bus 9.

Operation of the main line contactor 6 establishes a holding circuit for itself through contact members 10 and also effects the closing of contact members 11, 12, 13 and 32. The closing of the contact members 11, 12 and 13 establishes circuits for certain of the primary windings of the motor 18. Primary windings 15, 16 and 17 are directly connected to the buses 1, 9 and 14, whereas the primary windings 22, 23 and 24 are connected to the buses through impedances 25, 26 and 27. The motor 18 is thus started with a high starting torque with a comparatively low starting current.

The closure of contact members 32 establishes a circuit from the energized conductor 4, through contact members 32, actuating coil 33 of time limit relay 34, to the energized conductor 8. After a predetermined time interval, determined by the adjustment of the timing device 60, contact members 37 are closed whereupon the circuit is established from the energized conductor 4 through contact members 37, actuating coil 38 of the first sequence control contactor 39, to the energized conductor 8. Operation of the sequence control contactor 39 effects the closing of contact members 41, 42, 43 and 44. The closure of contact members 42, 43 and 44 effects the shunting of the impedances 25, 26 and 27, thereby increasing the speed of the motor 18.

The closure of contact members 41 establishes a circuit from the energized conductor 4 through contact members 41, actuating coil 45 of the time limit relay 46, to the energized conductor 8. After a time interval determined by the adjustment of the timing means 61, contact members 48 close, thereby establishing an energizing circuit from the energized conductor 4 through contact members 48, actuating coil 49 of the second sequence control contactor 50 to the energized conductor 8.

Operation of the sequence control relay 50 effects the closing of contact members 51, 52 and 53, thereby completing the circuit for the primary windings 57, 58 and 59 thus directly connecting all of the primary windings of the motor 18 to the source of supply.

In the modification shown in Fig. 2, all of the elements corresponding to the showing in Fig. 1 are given the same reference characters, and those elements that are similar have primed corresponding reference characters. For some applications it is necessary to have a lower starting current than for the showing in Fig. 1 and it suffices to have fewer starting steps. In such cases, a different motor is used, that is, one in which the primary windings 15, 16 and 17 are omitted. The sequence of starting is there effected for the primary windings 22', 23' and 24' first through the impedances 25, 26 and 27, thereafter directly to the source of supply, and thereafter the remaining primary windings 57', 58' and 59' are directly connected to the source of supply by the closure of contact members 51, 52 and 53.

I am, of course, aware that others after having had the benefit of the teachings of my invention may devise other circuit arrangements using my novel contribution to the starting of alternating current motors, but I, therefore, wish to be limited only to the scope of the claims as hereto appended and not to the specific showings made.

I claim as my invention:

1. In a starting control for an alternating current motor, in combination, an alternating current motor having a plurality of primary windings, impedance means in series circuit with one of said primary windings, a source of alternating current, means for connecting the primary windings including the impedance means in their circuits to the source of alternating current, and means for connecting the remaining primary windings to the source of alternating current.

2. In a starting control for an alternating current motor, in combination, an alternating current motor having a plurality of primary windings, impedance means in series circuit with one of said primary windings, a source of alternating current, means for connecting the primary windings including the impedance means in their circuits to the source of alternating current, means for shunting the impedance means, and means for connecting the remaining primary windings to the source of alternating current.

3. In a starting control for an alternating current motor, in combination, an alternating current motor having a plurality of primary windings, impedance means in series circuit with one of said primary windings, a source of alternating current, means for connecting the primary windings including the impedance means in its circuit and one of the other primary windings to the source of alternating current and means for connecting the remaining primary windings to the source of alternating current.

4. In a starting control for an alternating current motor, in combination, an alternating current motor having a plurality of primary windings, impedance means in series circuit with one of said primary windings, a source of alternating current, means for connecting the primary windings including the impedance means in its circuit and one of the other primary windings to the source of alternating current, means for shunting the impedance means, and means for connecting the remaining primary windings to the source of alternating current.

5. In a starting control for an alternating current motor, in combination, an alternating current motor having a plurality of primary windings, impedance means in series circuit with one of said primary windings, a source of alternating current, electromagnetic means for connecting the primary windings including the impedance means in their circuits to the source of alternating current, and electromagnetic means, controlled by and set in operation a time interval after the operation of the first electromagnetic means, for connecting the remaining primary windings to the source of alternating current.

6. In a starting control for an alternating current motor, in combination, an alternating current motor having a plurality of primary windings, impedance means in series circuit with one of said primary windings, a source of alternating current, electromagnetic means for connecting the primary windings including the impedance means in their circuits to the source of alternating current, and electromagnetic means, controlled by and set in operation a time interval after the operation of the first electromagnetic means, for shunting the impedance means, and electromagnetic means controlled by and set in operation after the operation of the second mentioned electromagnetic means for connecting the remaining primary windings to the source of alternating current.

7. In a starting control for an alternating current motor, in combination, an alternating current motor having a plurality of primary windings, impedance means in series circuit with one of said primary windings, a source of alternating current, electromagnetic means for simultaneously connecting the primary windings including the impedance means in their circuits and one of the other primary windings to the source of alternating current, and electromagnetic means controlled by and set in operation a time interval after the operation of the first electromagnetic means for connecting the remaining primary windings to the source of alternating current.

8. In a starting control for an alternating current motor, in combination, an alternating current motor having a plurality of primary windings, impedance means in series circuit with one of said primary windings, a source of alternating current, electromagnetic means for simultaneously connecting the primary windings including the impedance means in their circuits and one of the other primary windings to the source of alternating current, and electromagnetic means controlled by and set in operation a time interval after the operation of the first electromagnetic means for shunting the impedance means, and electromagnetic means controlled by and set in operation after the operation of the second mentioned electromagnetic means for connecting the remaining primary windings to the source of alternating current.

9. In a starting control for an alternating current motor, in combination, an alternating current motor having a plurality of primary windings, impedance means in series circuit with one of said primary windings, a source of alternating current, electromagnetic means for connecting the primary windings including the impedance means in their circuits to said source of alternating current, a time limit relay controlled by said electromagnetic means, electromagnetic means, set in operation by the operation of the time limit means, for connecting the remaining primary windings to the source of alternating current.

HANS TRASSL.